Figure 4:
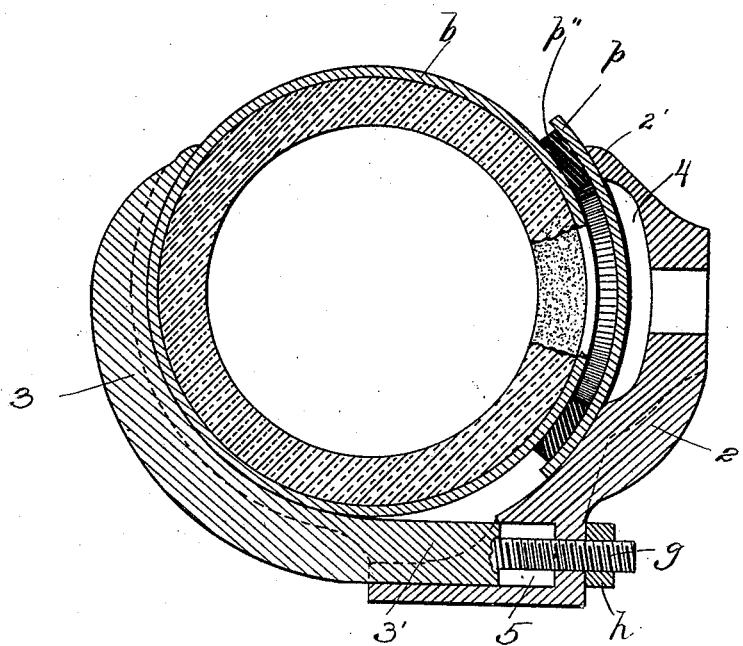

(No Model.) 2 Sheets—Sheet 1.
T. McHUGH.
CLAMP FOR PIPES AND MAINS.
No. 444,235. Patented Jan. 6, 1891.
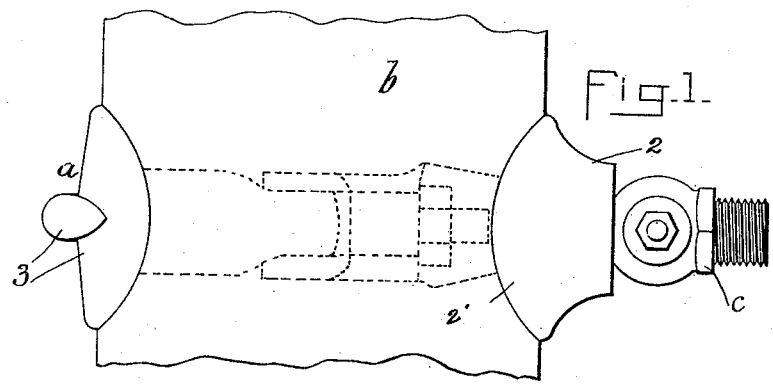
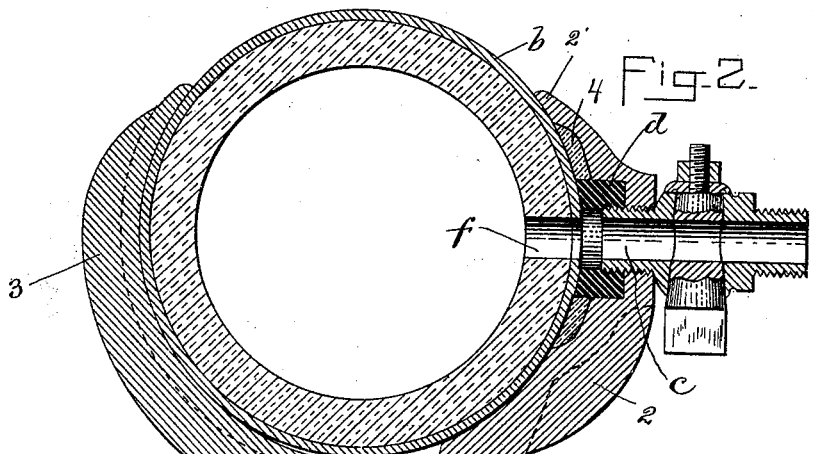
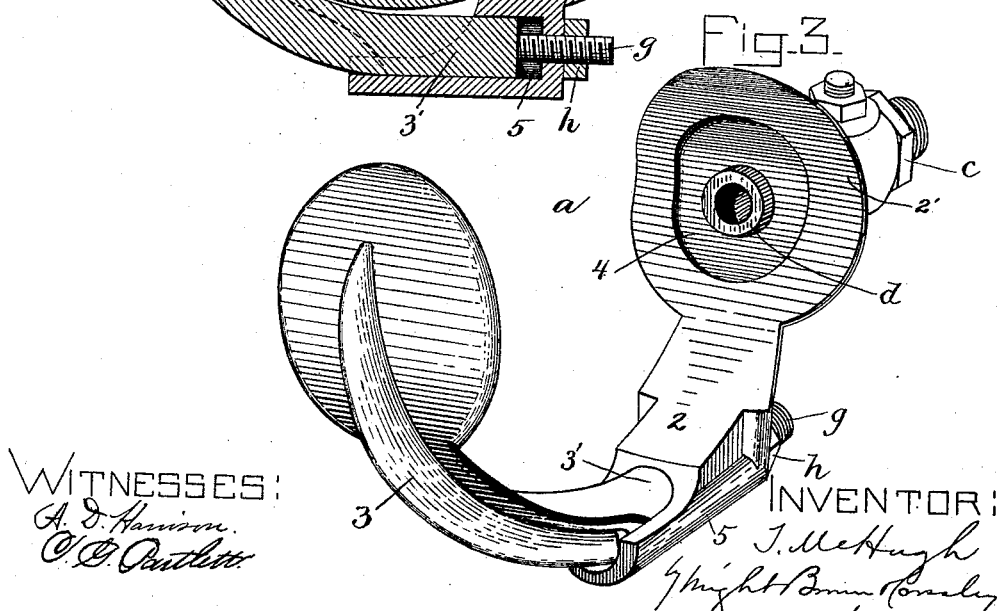
WITNESSES:
A. D. Harrison.
O. D. Bartlett.
INVENTOR:
T. McHugh
Wright Brown Quinby
Attys.

(No Model.) 2 Sheets—Sheet 2.

T. McHUGH.
CLAMP FOR PIPES AND MAINS.

No. 444,235. Patented Jan. 6, 1891.

WITNESSES
INVENTOR

UNITED STATES PATENT OFFICE.

TIMOTHY McHUGH, OF WAKEFIELD, ASSIGNOR OF ONE-HALF TO THE SMITH & ANTHONY STOVE COMPANY, OF BOSTON, MASSACHUSETTS.

CLAMP FOR PIPES AND MAINS.

SPECIFICATION forming part of Letters Patent No. 444,235, dated January 6, 1891.

Application filed March 28, 1890. Serial No. 345,715. (No model.)

*To all whom it may concern:*

Be it known that I, TIMOTHY McHUGH, of Wakefield, in the county of Middlesex and State of Massachusetts, have invented certain new and useful Improvements in Clamps for Pipes and Mains, of which the following is a specification.

This invention has for its object to provide an improved, simple, and efficient device for holding a branch pipe or tap in firm connection with the periphery of a water-conducting pipe or main, and particularly with a pipe composed of a sheathing of sheet metal and a lining of cement, it being the particular object of the invention to provide improved means to hold a branch pipe or nozzle and a packing around its inner end so firmly and closely against the periphery of the pipe or main that no water can escape through the joint or crevice between the periphery of the pipe or main and the inner end of the branch pipe or nozzle when a hole is drilled through the side of the pipe or main in continuation of the bore of the branch pipe.

To these ends the invention consists in the improvements which I will now proceed to describe and claim.

Of the accompanying drawings, forming a part of this specification, Figure 1 represents a side view of a portion of a water-conducting pipe or main having my improved device applied thereto. Fig. 2 represents a section on line 2 2, Fig. 1. Fig. 3 represents a horizontally-disposed perspective view of the device constituting my improvement removed from the main. Fig. 4 represents a sectional view showing my improved device used as a means for stopping a leak in a cement-lined pipe or main.

The same letters and figures of reference indicate the same parts in all the views.

In carrying out my invention I make a clamp $a$, adapted to partially encircle a water-conducting pipe or main $b$, said clamp being composed of two sections 2 and 3. The section 2 is provided with an enlarged circular end 2', made concave at one side to fit the periphery of the pipe or main $b$, said enlarged end being tapped to receive the branch pipe or tap $c$, which is screwed into the tapped orifice in the center of the enlarged end 2'. Around the inner end of the branch $c$ the section 2 is recessed to receive a rubber ring or washer $d$, which surrounds the branch $c$ and projects inwardly, so that when the clamp is applied to the pipe $b$ the rubber ring or washer will bear at its outer end upon the periphery of the pipe, and will be compressed so closely between the pipe and the section 2 that no water can escape between the periphery of the pipe and the rubber ring when a hole $f$ is bored through the periphery in continuation of the bore of the branch $c$ by drill or boring-tool inserted through said branch. The concave side of the enlarged end of the section 2 has a recess 4 surrounding the rubber ring $d$ and adapted to contain a filling or packing of cement to form a permanent water-tight joint around the branch $c$, as hereinafter explained. The general form of the section 2 is such that it fits the periphery of the pipe or main $b$ for the greater part of its length, as shown in Fig. 2. On one end of the section 2 is formed a horizontally-disposed socket 5, which receives the horizontal straight cylindrical shank 3', which is also provided with an outer enlarged circular end concaved on its inner face to fit the pipe or main, formed on one end of the clamp-section 3. On one end of the shank 3' is formed a screw-threaded stem $g$, which passes through an orifice in one end of the socket 5, and is engaged outside of said socket with a nut $h$. The inner side of the clamp-section 3 is curved to fit the exterior of the pipe or main $b$, the curvature of said inner side forming a continuation of that of the inner side of the section 2, so that said sections together have an extended bearing on the periphery of the pipe or main extending considerably more than half around the same, as shown in Fig. 2, the outer enlarged ends of said sections being diametrically opposed to each other.

In applying the clamp or holder to the pipe or main $b$ the nut $h$ is turned off or outwardly until the outer ends of the sections 2 3 are sufficiently separated to permit the free application of the clamp to the pipe or main. The nut $h$ is then turned inwardly against the shoulder on the section 2 at one end of the socket 5 until the clamp is contracted by the drawing of the shank 3' into the socket 5 to such an extent that the concave inner surfaces of both sections of the clamp come to a firm bearing on the periphery of the pipe or main b. The main is therefore closely embraced, so that the pressure applied to its periphery at one side by means of the drill or tool that is introduced through the branch c to tap a hole in the pipe or main cannot cause the pipe to bulge at any point, and therefore is not liable to crack or injure the cement lining at any point excepting where it penetrates said lining. If it were not for the extended bearing of the clamp upon the periphery of the pipe, the pressure of the drill or tool might cause the periphery of the pipe or main to yield at the point where the tool enters and bulge at other points; hence cracking of the cement lining would be likely to occur.

The application of the clamp to the periphery of the pipe or main, as above described, compresses the rubber ring or packing $d$, so that said ring has a water-tight bearing on the periphery of the pipe or main around the point where the hole is to be made, and confines the cement filling which is placed in the recess 4, and prevents the access of water to said filling when the hole is first made in the pipe or main. Hence the filling has time to solidify and set before it can be acted upon by water escaping from the pipe or main through the branch.

The clamp being in place on the pipe or main, as above described, a tool is introduced into the branch to form the hole $f$ through one side of the pipe or main.

It will be seen from the foregoing that the branch pipe or tap is securely attached to the pipe or main by the clamp or holder $a$, and that the operation of applying said clamp or holder forms at the same time a tight joint between the inner end of the branch pipe and the pipe or main, which effectually prevents leakage of water when the tapping-tool is withdrawn and the water commences to flow through the branch pipe. The cement filling in the recess 4, being protected, as already described, while in its fresh or plastic condition from the action of the escaping water by the rubber ring $d$, is enabled to set or harden in such form that it constitutes a tight filling or packing adapted to prevent the escape of water between the periphery of the pipe or main and the section 2 of the clamp or holder after the rubber ring has become useless by age.

I do not limit myself to the employment of the described clamp or holder in connection with a branch pipe $c$ inserted in one of the sections of said clamp or holder.

Fig. 4 shows the clamp used without the branch pipe as a means for holding a patch or covering $p$ of sheet metal against the periphery of the pipe or main as a means for stopping a leak therein. In this case the sheet-metal patch is placed on the periphery of the pipe or main $b$, and the clamp is then applied in the manner already described and presses the patch closely against the periphery of the pipe and holds it firmly in position. A ring or packing $p''$, of rubber or other suitable material, should be interposed between the patch and the periphery of the pipe or main, said packing being formed to surround the hole or defective place in the pipe.

I am aware that it is not new to provide clamps for pipes or mains to hold a branch pipe or nozzle, such clamps consisting of two parts entirely encircling (or nearly so) the pipes or mains and having both their opposite ends connected together by threaded bolts; but my invention is designed as an improvement over such construction, in that the two members or sections of the clamp have outer enlarged curved free ends which are approximately diametrically opposed to each other, so as to hug a pipe or main at opposite points; and the improvement further consists in uniting these members or sections only at their lower horizontal ends, whereby as these latter ends are brought together the outer free ends of the members or sections are made to clamp against the pipe or main. Hence but one joint or point of connection is necessary in my clamp, and the parts can be readily and securely united, and there is less danger of the sections being loosened or deranged.

I claim—

1. The herein-described improved pipe-clamp, comprising the two curved members or sections having inner concaved faces and outer opposite diametrically-opposed enlarged curved ends, one of said sections having a lower horizontal socket and an aperture and the other section having its lower end secured in said socket and provided with a threaded stem extended through said aperture, and the nut working on said stem and bearing against a shoulder on said former section, substantially as set forth.

2. The herein-described improved pipe-clamp, consisting of the curved member or section 2, having an inner concaved face, an outer enlarged end, a recess formed in said end for reception of a filling and a branch or outlet receiving-orifice, said section being provided at its lower horizontal end with a socket and an aperture, and the section 3, also having an inner concaved face and an outer enlarged end diametrically opposed to said end of said former section and provided at its lower horizontal end with a threaded stem projected through said socket and aperture of said section 2, a nut on said stem bearing against a shoulder of said latter section, and a packing $d$, substantially as set forth.

In testimony whereof I have signed my name to this specification, in the presence of two subscribing witnesses, this 19th day of March, A. D. 1890.

TIMOTHY McHUGH.

Witnesses:
C. F. BROWN,
DAVID W. GORMAN.